United States Patent [19]
Johansson, Jr.

[11] 3,839,799

[45] Oct. 8, 1974

[54] GAGE

[75] Inventor: Eric H. Johansson, Jr., Poughkeepsie, N.Y.

[73] Assignee: Dorsey Gage Co., Inc., Hyde Park, N.Y.

[22] Filed: Aug. 9, 1972

[21] Appl. No.: 278,954

[52] U.S. Cl. .............................................. 33/147 K
[51] Int. Cl. ............................................. G01b 5/12
[58] Field of Search.. 33/147 K, 146, 172 R, 143 R, 33/147 F, 178 D, 178 F, 169 B, 164 D, 147 J, 147 T, 147 H, 147 E, 143 M, 158

[56] References Cited
UNITED STATES PATENTS

| | | | |
|---|---|---|---|
| 3,067,520 | 12/1962 | Geraghty........................... | 33/147 K |
| 3,414,978 | 12/1968 | Prow.................................. | 33/143 R |

*Primary Examiner*—Louis R. Prince
*Assistant Examiner*—Willis Little

[57] ABSTRACT

A gage for indicating variations in the surface of a workpiece, the gage including a frame having a pair of projecting fingers, one of the fingers being fixed to the frame to define a reference and the other of the fingers being movable with respect to the frame and for engagement with a surface of the workpiece. A shaft, which is connected to the movable finger, is mounted for reciprocation in the frame permitting movement of the movable finger towards and away from the fixed finger. A dial indicator is mounted in such a manner as to indicate the movement of the movable finger. A pair of spaced apart tracks are connected to the frame, the tracks being positioned substantially parallel to the axis of the shaft and extending axially outboard thereof. Support guides are mounted on the movable finger and are engageable with each of the tracks to thereby inhibit lateral motion of the movable finger.

The purpose of this abstract is to enable the public and the Patent Office to determine rapidly the subject matter of the technical disclosure of the application. This abstract is neither intended to define the invention of the application nor is it intended to be limiting as to the scope thereof.

6 Claims, 6 Drawing Figures

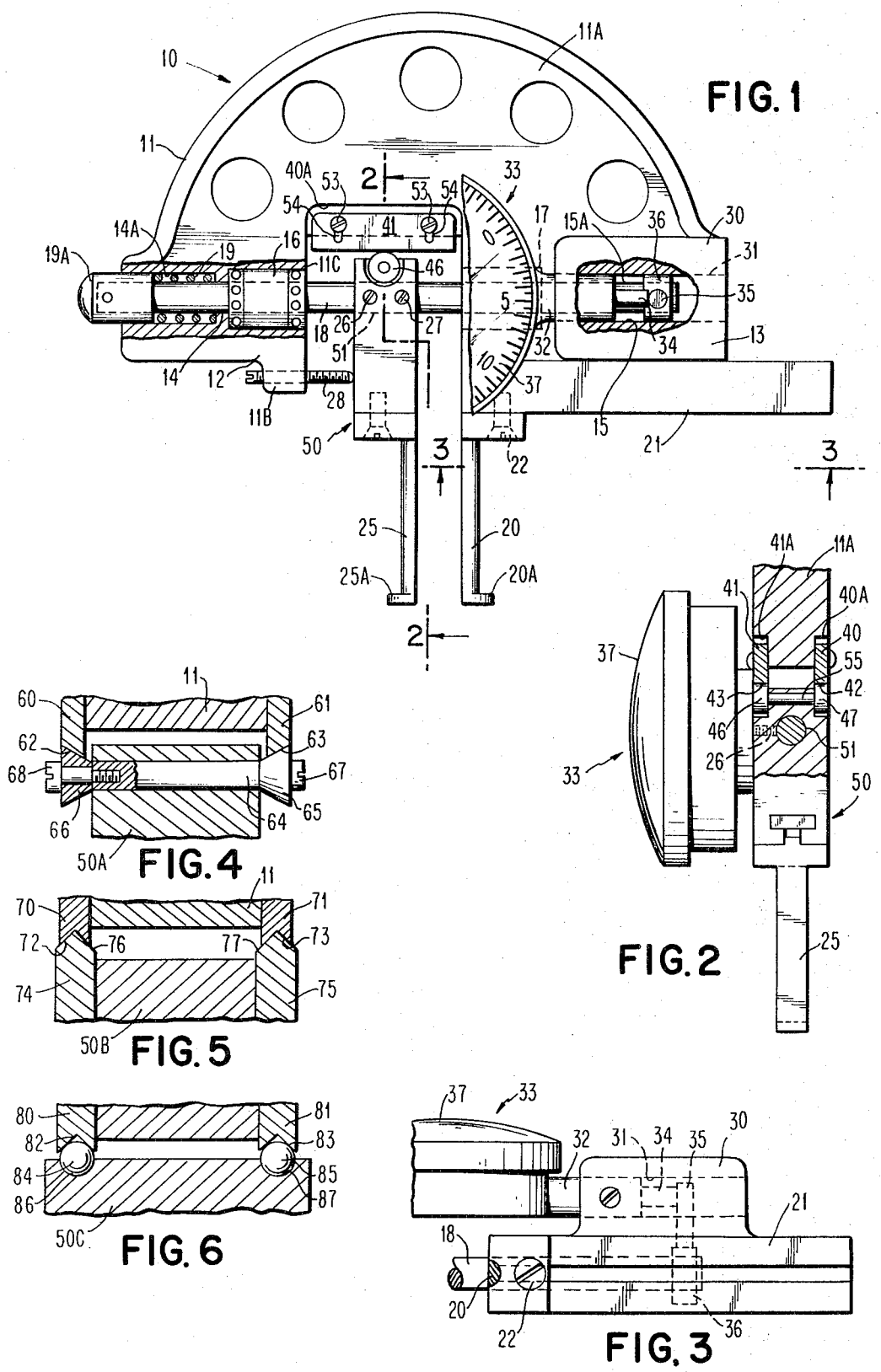

GAGE

SUMMARY OF THE INVENTION & STATE OF THE PRIOR ART

The present invention relates to a gage, and more particularly relates to improvements in gages for indicating variations in the surface of a workpiece, especially cylindrical workpieces.

Gages used to indicate variations in the surface of a workpiece, and therefore, for example, variations in the diameter of either internal or external grooves in a cylindrical workpiece, are well known in the art. Presently used gaging devices employ, for example, a pantograph type movement, or a reed motion, either of which has inherent limitations relative to variations in tolerance over large range differences.

Another gaging device used for checking internal grooves, for example in a cylindrical bore, employs a scissors type mechanism in which the arms of the gage are collapsed for insertion into the groove. Because the movement of the gage is not linear, and the wider the arc and greater the tolerance, the more inaccurate the gage, its uses except under specific design instances, is limited. Additionally, with a scissors type movement the caliper is pinned or doweled and as the pin or dowel wears in the bearing, or if it is not precisely accurate when originally fabricated, an error will appear on the indicator.

The improved gage of the present invention relates to a gage of the type wherein fingers project from the basic frame of the gage and contact the surface to be checked. A gage of this type is shown in U.S. Pat. No. 3,638,324 to Kaifesh. However, gages of this type exhibit a problem which relates to the lateral stability of the movable finger. The problem of lateral deflection of the movable finger results in an erroneous indication on the indicator coupled to the movable finger.

Several designs have been implemented for minimizing the lateral or torsional rotation of the movable finger to prevent such erroneous indications, the most notable being the use of a V groove or dove-tail channel in or behind the movable finger on the frame and mating means coupling the finger to the groove or channel. However, when wear occurs, the lateral instability still exists and tends to increase. Additionally, the V groove slide or channel creates an additional friction problem which reduces the sensitivity of the gage and the feel thereof when attempting to measure or indicate variations in the surface being gaged.

In view of the above, it is a principal object of the present invention to provide a gage including a fixed and movable finger, and incorporating means to inhibit lateral motion of the movable finger without a deleterious effect upon the motion of the movable finger towards the fixed finger.

Another object of the present invention is to provide a novel gage having means to permit movement of a movable finger to indicate variations in the surface of a workpiece while retaining the sensitivity of the gage by minimizing friction and simultaneously inhibiting lateral motion of the movable finger.

Yet another object of the present invention is to provide a gage with the foregoing advantages which may be quickly and easily modified so as to check either external or internal surfaces of a cylindrical workpiece to indicate variations in the surface thereof.

Yet another object of the present invention is to provide a novel gage in which compensation may be made for wear due to friction.

Still another object of the present invention is to provide on the frame of the gage a pair of adjustable tracks which may be positioned substantially parallel to the movement of the movable finger, and spaced substantially outboard of the axis of travel and engageable with guide means on the movable finger to thereby inhibit lateral motion of the movable finger.

Yet another object of the present invention is to provide a gage of simple but rugged construction while being inexpensive to fabricate without loss of accuracy.

Other objects and a more complete understanding of the invention may be had by referring to the following specification and claims taken in conjunction with the accompanying drawing in which:

FIG. 1 is a fragmentary sectional view of an improved gage constructed in accordance with the present invention;

FIG. 2 is an enlarged fragmentary sectional view taken along line 2—2 of FIG. 1;

FIG. 3 is a fragmentary sectional view taken along line 3—3 of FIG. 1;

FIG. 4 is an enlarged fragmentary view of another embodiment of means to inhibit lateral motion of the movable finger shown in the gage of FIG. 1;

FIG. 5 is an enlarged fragmentary sectional view of yet another embodiment of means to inhibit lateral motion of the movable finger of the gage; and FIG. 6 is an enlarged fragmentary sectional view of still another embodiment to inhibit lateral motion of the movable finger.

Referring now to the drawing and especially FIG. 1 thereof, an improved gage 10, constructed in accordance with the present invention, is illustrated therein. As shown, the gage comprises a semi-annular or arcuate frame 11, having a web portion 11A terminating in enlarged, aligned, but spaced apart first and second end portions 12 and 13 respectively. Each of the end portions 12 and 13 includes bores 14 and 15 respectively which are axially aligned, and fitted with bushings 16 and 17 (preferably of the ball type) adapted to receive for reciprocation therein, a shaft 18. Projecting from the frame are a pair of fingers 20 and 25, the finger 20 being adjustably connected to a track 21 as by a screw or the like 22. The finger 25 includes an enlarged support section 50 having a bore 51 therein which permits connection of the support to the shaft as by screws 26 and 27. As best shown in FIG. 1, the finger 25 is mounted for reciprocation in a cutaway section 11C intermediate the end portions 12 and 13.

As illustrated the finger 25 is movable toward and away from the fixed finger 20 which acts as a gaging reference, at least one of the fingers, in the present instance both fingers being adapted for engagement with a workpiece. In the illustrated instance, each of the fingers 20 and 25 includes an extended feeler portion 20A, 25A for engagement, for example, with the interior of a cylindrical bore or groove, to gauge the tolerance or variations in the surface of such a bore or groove.

In order to measure variations which are effected by the finger 25 moving along a surface being gaged for variations, means are provided for coupling an indicator to the finger 25, in the present instance the shaft 18 to which the finger is connected, thereby giving a direct indication of fluctuations or variations in the surface being gaged. To this end, and inasmuch as the gage employed as an example is utilized for checking internal dimensional variations, the shaft 18 is biased as by biasing means 19 housed in an enlarged portion 14A of the bore 14 and engageable with a cap 19A secured to the shaft 18. In the present instance the upward motion of the shaft is limited by an adjustable stop 28 mounted on an offset 11B on the frame 11, the stop in the illustrated instance comprising an adjustable screw which engages the finger 25 thereby limiting its motion.

As best illustrated in FIGS. 1 and 3, the second end portion 13 includes an offset 30 having a bore 31 therein for receiving the shaft housing 32 of a dial indicator 33. The shaft 34 of the dial indicator 33 engages an arm 35 which is connected to the shaft 18 as by a collar 36, the arm 35 extending through a slot 15A (see FIG. 1) in the second end portion 13 and providing communication between the bore 15 and the bore 31. In this manner, reciprocatory movement of the shaft 18 is indicated on the dial gage 37 of the dial indicator 33.

With a sensitive dial indicator, any rotational movement of the shaft 18 or finger 25 will cause variations in the reading on the dial indicator. Additionally, lateral misalignment of the finger 25 relative to the fixed finger 20 will also cause erroneous readings of the surface being gaged. Accordingly, it is essential for fine exact readings to inhibit lateral motion of the movable finger 25 while at the same time avoiding excess friction on the movable finger which would reduce sensitivity of the gage and thereby reduce the accuracy of indications of variations in the surface being checked.

In accordance with the invention, means are provided to inhibit lateral motion of the movable finger while holding at a minimum any effect tending to decrease the ability of the shaft to move or reciprocate in the bores 14 and 15. To this end, and as best illustrated in FIGS. 1 and 2, a pair of spaced apart tracks 40 and 41 are adjustably connected to the frame 11 in the illustrated instance on opposite sides thereof in recesses 40A and 41A respectively, the tracks having a wear surface 42 and 43 respectively which are substantially parallel to the axis of the shaft 18 and extending axially outboard thereof. Mounted on the finger 25 are guide means 46 and 47 respectively engageable with the wear surfaces 42 and 43 of the tracks 40 and 41, the guide means being adapted to ride against the tracks for the full reciprocable movement of the shaft 18 while inhibiting rotation of the shaft or lateral movement of the movable finger 25.

In essence the tracks 40 and 41 are gibs which are adjustably connected to the frame as by screws 53 threaded into the frame through slots 54 extending substantially perpendicular to the axis of the shaft 18, permitting adjustment of the tracks towards and away from the guide means 46 and 47 respectively.

In order to insure ease of movement of the finger, reciprocatively with the shaft 18 while inhibiting rotation of the shaft 18, it is preferable that the guide means 46 and 47 comprise ball or roller bearings which may be mounted on a shaft 55 which extends through the support 50. Therefore the shaft and guide means form, effectively, a three point support for the finger 25, the positioning of the tracks being substantially outboard of the central axis of the shaft providing a stability which inhibits lateral movement of, even the extended end of the finger 25, while the bearings provide free movement of the finger horizontally or reciprocatively with the shaft 18.

Although it is preferred that the guide means 46 and 47 comprise rollers so as to decrease friction of the movable finger towards and away from the fixed finger 20, alternate embodiments may be utilized to inhibit the lateral motion of the movable finger 25. To this end, and referring first to FIG. 4, a pair of tracks 60 and 61 corresponding to the tracks 40 and 41 heretofore described, may include a beveled forward surface 62 and 63, the tracks extending substantially parallel to the axis of the movable shaft (not shown) corresponding to the shaft 18. As illustrated, mounted on the support 50A (corresponding to the support 50 of movable finger 25) is a shaft 64 having guide means 65 and 66 thereon, in the illustrated instance frustoconical rollers having a slope such as to engage with the bevel on the forward surfaces 62 and 63 of the track 60 and 61. As noted in the drawing, the rollers 65 and 66 may be coupled for rotation with respect to the shaft by means of shoulder screws 67 and 68 respectively which permit rotation of the beveled rollers while preventing lateral shifting of the support 50A.

In still another embodiment of the invention, the tracks 70 and 71 may be adjustably coupled to the frame 11, the tracks each having V-shaped grooves 72 and 73 in the forward surface thereof extending substantially parallel to the axis of the shaft 18 (not shown). As shown in FIG. 5, mounted on the support 50B, corresponding to the support 50 illustrated in FIGS. 1 and 2, are guide means 74 and 75 having projecting V-shaped slide portions 76 and 77 for engagement with the V-shaped grooves 73 and 73 on the tracks 70 and 71. While the friction in this type of system is higher than either the friction shown in FIG. 4 or in the preferred embodiment of FIGS. 1-3, where extreme sensitivity is not necessary, this structure will serve to inhibit lateral motion of the support 50B and prevent rotation of the shaft 18.

In still another embodiment shown in FIG. 6, the tracks may be similar to the tracks shown in FIG. 5. In the illustrated instance tracks 80 and 81 have V shaped grooves 82 and 83 adapted to mate with balls 84 and 85 respectively housed in sockets 86 and 87 in the support 50C (corresponding to support 50) of the movable finger. In this embodiment the balls 84 and 85 serve as the guide means and tend to inhibit rotation or lateral movement of the support 50C.

In all embodiments it is desirable that the tracks are adjustable so that during initial setup proper pressure may be placed upon the associated guide means to prevent rotation of the shaft 18 thereby giving false readings on the dial indicator 33. Additionally, the adjustment of the tracks is desirable so as to permit compensation for wear after extended use of the gage.

It should be recognized that a track and guide means combination may be utilized with any gage incorporating at least one movable member whose action must be linear with respect to a fixed reference. For example, the gage illustrated in FIG. 1 may be modified so as to read external surface variations in cylindrical workpieces. This modification may be accomplished by removing the biasing spring 19, and the dial indicator 33, and installing the spring in the bore 31 against the arm 35 so as to tend to close the finger 25 against the finger 20. Inasmuch as the spring is placed where the shaft housing 32 of the dial indicator was, the dial indicator is placed in the bore 15, the shaft 34 of the indicator contacting the end of the shaft 18. If desired, the feeler portions 20A, 25A of the fingers 20 and 25 may be reversed so as to gauge an external, circumferentially extending groove.

Thus the apparatus of the present invention provides a simple yet economical means for stabilizing the moving portion of a gage by inhibiting torsional movement of the movable member while keeping friction, when necessary, to a minimum.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. A gage for indicating variations in the surface of a workpiece, said gage comprising: a frame; a shaft mounted for reciprocation in said frame; a support fixed to said shaft; a pair of projecting fingers, one of said fingers being fixed to said frame to define a reference and the other of said fingers being mounted on said shaft for reciprocation of said shaft in said frame, producing movement of said movable finger towards and away from said fixed finger; indicator means to indicate said movement; a pair of spaced apart tracks connected to said frame, said tracks being positioned substantially parallel to the movement of said movable finger, and arranged outboard of the axis of said shaft means and guide means mounted on said support engageable with each of said tracks to thereby inhibit lateral motion of said movable finger; said tracks comprise gibs each having a surface portion in confronting engagement with said guide means; and, means to effect adjustment of said gibs relative to said guide means.

2. A gage in accordance with claim 1 wherein said guide means comprises spaced apart bearings, and means mounting said bearings on said support.

3. A gage for indicating variations in the surface of a workpiece, said gage comprising: a frame; a shaft mounted for reciprocation in said frame; an indicator coupled to said shaft to indicate reciprocatory movement thereof; a work surface engaging finger connected to said shaft for movement therewith; a pair of laterally spaced apart tracks having a surface portion extending substantially parallel to the axis of said shaft; a pair of guide means in operative engagement with said tracks; one of said pairs mounted on said frame and the other of said pairs mounted on said finger and movable therewith, whereby rotational movement of said shaft is inhibited; and, one of said pairs being adjustable relative to the other of said pairs.

4. A gage in accordance with claim 3 wherein said tracks comprise gibs.

5. A gage in accordance with claim 3 wherein each of said guide means comprises a bearing mounted for rotation on said finger.

6. A gage in accordance with claim 3 wherein each of said pairs is positioned outboard of said shaft.

* * * * *